United States Patent
Kluge

(10) Patent No.: US 8,739,645 B2
(45) Date of Patent: Jun. 3, 2014

(54) TOOTHED-RACK STEERING GEAR, AND SERVO STEERING SYSTEM EQUIPPED WITH THE SAME

(75) Inventor: Torsten Kluge, Overath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 13/356,805

(22) Filed: Jan. 24, 2012

(65) Prior Publication Data
US 2012/0186897 A1    Jul. 26, 2012

(30) Foreign Application Priority Data
Jan. 25, 2011 (DE) .................. 10 2011 003 086

(51) Int. Cl.
*F16H 35/00* (2006.01)
*F16H 1/04* (2006.01)

(52) U.S. Cl.
USPC ........................................ 74/388 PS; 74/422

(58) Field of Classification Search
USPC ....................... 74/388 PS, 409, 422
See application file for complete search history.

(56) References Cited

U.S. PATENT DOCUMENTS

| | | | |
|---|---|---|---|
| 4,800,770 A * | 1/1989 | Kobayashi et al. | 74/422 |
| 7,159,689 B2 | 1/2007 | Murakami | 180/444 |
| 7,487,984 B1 * | 2/2009 | Lemont et al. | 280/93.514 |
| 8,465,034 B2 * | 6/2013 | Heo | 280/93.515 |
| 2002/0124670 A1 * | 9/2002 | Bugosh | 74/388 PS |
| 2006/0185460 A1 * | 8/2006 | Shiino et al. | 74/422 |
| 2007/0209463 A1 * | 9/2007 | Song et al. | 74/388 PS |
| 2011/0265591 A1 | 11/2011 | Plataret et al. | 74/409 |

FOREIGN PATENT DOCUMENTS

EP    1 084 933 A1    2/2001    ............ B62D 3/12

\* cited by examiner

*Primary Examiner* — Ha D Ho
(74) *Attorney, Agent, or Firm* — L.C. Begin & Associates, PLLC

(57) ABSTRACT

Described is a toothed-rack steering gear having a drive pinion (3) which is rotatably mounted in a steering housing (2) and which engages into a toothed rack (4) which is axially movably mounted in the steering housing (2), having a thrust piece (5) which preloads the toothed rack (4) against the drive pinion (3), and having at least one further machine element (15) which is operatively connected to the toothed rack (4) and which is mounted so as to be radially immovable with respect to the toothed rack (4), wherein the preload force exerted on the toothed rack (4) by the thrust piece (5) causes bending of the toothed rack (4).

9 Claims, 2 Drawing Sheets

TOOTHED-RACK STEERING GEAR, AND SERVO STEERING SYSTEM EQUIPPED WITH THE SAME

Figure 1:
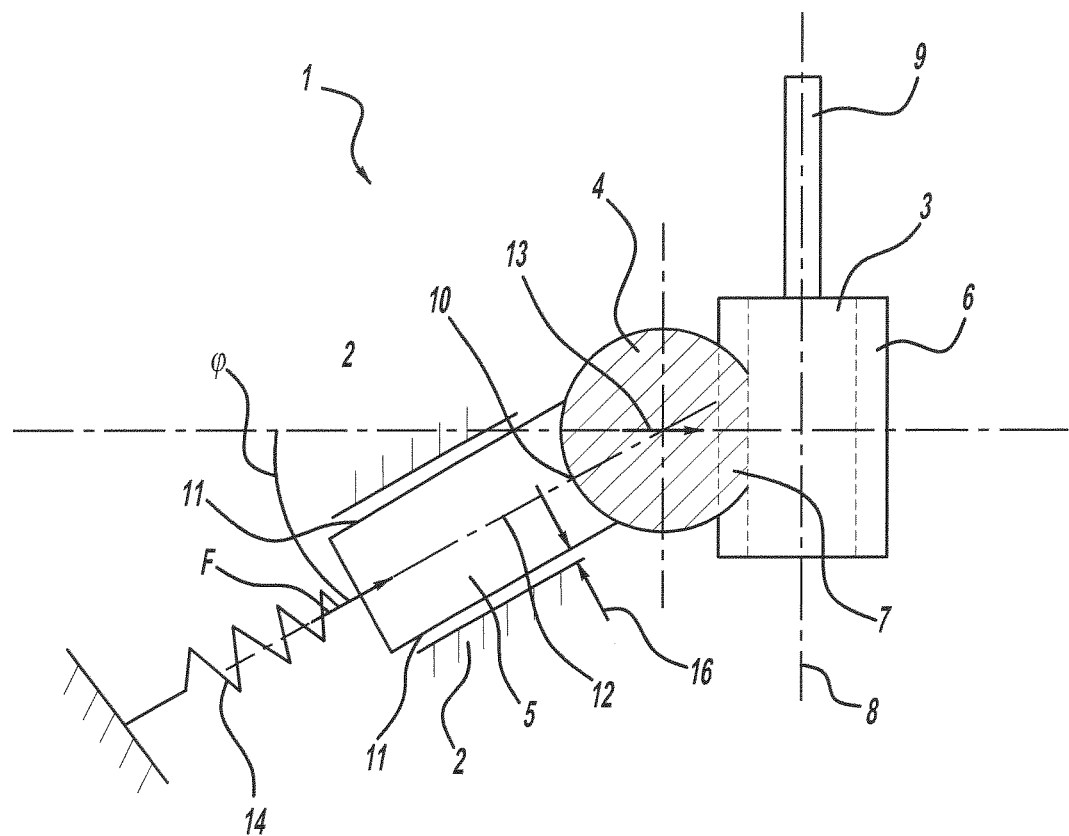

The present invention relates to a toothed-rack steering gear, in particular for a servo steering system of a motor vehicle, as per the preamble of claim 1, and to a servo steering system, as per claim 9.

Toothed-rack steering gears are generally known in a variety of designs. For example, DE 101 62 470 A1 discloses a steering gear for a motor vehicle in which a thrust piece by means of which the toothed rack is pressed against the drive pinion is guided in a longitudinally movable manner within a connecting piece of the steering gear housing. Here, a preload force acts on the thrust piece in such a way that the direction of action of the preload force acting on the thrust piece and the movement direction of the thrust piece enclose an angle. The aim of the invention is to prevent rattling noises as a result of alternating contact of the thrust piece. Such rattling noises may arise if, during the movement of the toothed rack, on account of the frictional force acting between the toothed rack and the thrust piece, the thrust piece is also moved radially slightly in the movement direction of the toothed rack, specifically to such an extent that the thrust piece comes into contact with the guide of the connecting piece.

Furthermore. US 2008/0202271 A1 discloses a toothed-rack steering gear having a device which serves to automatically compensate play which exists between the surfaces, which face toward one another, of a spring-loaded thrust piece and of a counter bearing against which the spring acting on the thrust piece is supported. For this purpose, the invention basically provides two wedge-shaped intermediate elements which are spaced apart from one another and which are connected to one another by means of an elastic element and which are arranged between the thrust piece and the counter bearing. The wedge shape of the intermediate elements and the force with which the elastic element pulls the intermediate elements toward one another have the effect that play that exists between the thrust piece and counter bearing is compensated by the intermediate elements, and the thrust piece is pressed against the toothed rack. It is inter alia the aim of the invention to prevent possible rattling noises on account of the play between the thrust piece and the counter bearing.

The scientific paper by Rao, T. G./Saha, S. K./Kar, I. N.: Sensor-actuator based smart yoke for a rack and pinion steering system. In: Proceedings of the 5th International Mobility Conference on Emerging Automotive Technologies: Global & Indian Perspective, India Habitat Center, Jan. 9-11 2008, pages 358-364, discloses a toothed-rack steering gear in which the preload force exerted on the toothed rack by a spring-loaded thrust piece is automatically varied or adapted as a function of a present position of the toothed rack. For this purpose, the position of the toothed rack is firstly determined by means of a measuring element, a preload force for the toothed rack or the thrust piece such as is desired for optimum steering feel is then determined, and said preload force is finally generated in the thrust piece by means of a servo motor.

In the case of a servo steering system, in particular an electric or electrically driven servo steering system, an electrical system operates instead of a hydraulic system. Said electrical system is usually composed of an electric motor, a gearing for transmitting forces, and the control electronics and sensor arrangement. The steering moment which is imparted for example by a driver is evaluated and converted into an electrical signal by the sensor arrangement of the servo steering system, which electrical signal is converted by the electric motor and gearing into a corresponding servo moment and transmitted to the steering system. Known electric servo steering systems are for example those with steering column drives, pinion drives and axially parallel drives or toothed rack drives.

In the case of servo steering systems, in particular electric or electrically driven servo steering systems, having a toothed rack drive (rack-type EPAS, EPAS=Electric Power Assisted Steering), a servo unit, for example a program-controlled electric actuating motor which is arranged parallel to or concentrically around the toothed rack, assists and overlays the steering movement generated by a driver. The assistance force provided by the servo unit is transmitted for example via a ball-screw drive to the toothed rack in order to pivot the steerable vehicle wheels. For this purpose, the toothed rack has, at least in sections, a ball screw with which engages a recirculating ball nut which is mounted so as to be immovable relative to a steering housing in the axial direction of the toothed rack. The recirculating ball nut is driven by the servo unit, for example via a belt or gearwheel mechanism, such that a rotational movement of the servo unit is converted into a longitudinal movement of the toothed rack.

The scientific paper by Nagahashi, Y./Kawakubo, A./Tsujimoto, T. et al.: Development of High Power Column-Type Electric Power Steering System. In: JTEKT Engineering Journal, 2007, no. 1003E, pages 35-39, discloses an electrically driven high-power servo steering system having a steering column drive suitable for imparting an axial force of 12 000 N to the toothed rack. To prevent the generation of noise in the toothed-rack steering gear, it is proposed that the thrust piece be mounted, with two O-rings arranged around its circumferential surface, in a corresponding receptacle in the steering housing, and that the weight of the toothed rack be reduced, for example by means of a deep drilling process.

Furthermore, DE 37 35 517 A1 describes a device for steering the rear wheels of a vehicle having four steerable wheels, which device has a rod part whose opposite ends are connected to the track rods for turning the rear wheels, has an electric motor and has a Screw-type mechanism for converting the rotation of the electric motor into an axial movement of the rod part. The stator and the rotor of the electric motor are arranged coaxially with respect to one another, wherein the rod part, the motor and the screw-type mechanism are arranged adjacent to one another in relation to the axial extent of the rod part. The screw-type mechanism comprises a threaded region on the rod part and a nut which engages into the threaded region, wherein the nut is preloaded in the axial direction. In one embodiment of the invention, the screw-type mechanism and the nut which engages into the threaded region of the rod part are described as a ball screw mechanism and a ball nut which engages with the rod part.

The use of ball-screw drives for transmitting the assistance force provided by a servo unit to the toothed rack may however lead to undesired, disturbing rattling noises. The cause of this is often a relative movement of the recirculating ball nut with respect to the toothed rack, which occurs in particular in the event of alternating loads on the toothed rack and/or on the ball-screw drive, because there is generally play in the axial direction of the toothed rack between the threaded section of the toothed rack and the recirculating ball nut that engages therewith. With conventional ball-screw drives, said play can duly be minimized, but can never be entirely eliminated.

A further noise source may likewise be the thrust pieces which, in particular in the event of alternating axial loads of the toothed rack, may tilt radially in their respective guides on account of the friction forces acting between the toothed rack and thrust piece.

Against this background, it is the object of the present invention to provide a toothed-rack steering gear, in particular for a servo steering system of a motor vehicle, and a servo steering system equipped with said toothed-rack steering gear, in particular an electric servo steering system with a toothed rack drive, in which the generation of undesired and disturbing rattling noises is prevented in a particularly simple and cost-effective manner, wherein the production, assembly and servicing outlay for the proposed toothed-rack steering gear and the proposed servo steering system is substantially no higher than that for already known solutions.

Said object is achieved by means of a toothed-rack steering gear having the features of claim 1 and by means of a servo steering system having the features of claim 9. Further particularly advantageous embodiments of the invention are disclosed in the subclaims.

It is pointed out that the features specified individually in the claims may be combined with one another in any desired technologically meaningful way and disclose further embodiments of the invention. The description, in particular in conjunction with the figures, characterizes and specifies the invention further.

According to the present invention, a toothed-rack steering gear, in particular for a servo steering system of a motor vehicle, has a drive pinion which is rotatably mounted in a steering housing and which engages into a toothed rack which is axially movably mounted in the steering housing, has a thrust piece which preloads the toothed rack against the drive pinion in order to ensure optimum engagement of the drive pinion and toothed rack with one another, and also has a further machine element which is operatively connected to the toothed rack and which is mounted so as to be radially immovable with respect to the toothed rack. According to the invention, the preload force exerted by the thrust piece on the toothed rack causes bending of the toothed rack.

Within the context of this invention, bending of the toothed rack is to be understood to mean a substantially elastic deformation of the toothed rack perpendicular to its longitudinal extent, such as may be caused for example by a force acting on the toothed rack perpendicular to its longitudinal extent (transverse force), if the toothed rack can deflect in the direction of action of the transverse force in an axial section around the point of engagement of the transverse force. That is to say, in a force-free state, the toothed rack must not, in the region of the point of engagement of the transverse force, be inhibited in terms of its movement already by a counter bearing acting counter to the direction of the transverse force.

The preload force which is exerted on the toothed rack by the thrust piece and which pushes the toothed rack against the drive pinion acts substantially perpendicular to the longitudinal extent of the toothed rack and is therefore a transverse force which can cause bending of the toothed rack within the meaning of this invention. Here, the direction of action of the preload force is expressly not restricted only to the direct engagement direction of toothed rack and drive pinion, but rather may also—at least partially—have a direction which deviates from the direct engagement direction. In other words, this means that, within the context of this invention, the bending of the toothed rack may take place in any spatial direction.

Within the context of this invention, the direct engagement direction is to be understood to mean that direction in which the toothed rack and the drive pinion can be moved together over the shortest distance in order to attain mutual engagement between the drive pinion and toothed rack.

If the direction of action of the preload force exerted on the toothed rack by the thrust piece and the direct engagement direction correspond, then by corresponding mounting of the drive pinion and toothed rack in the steering housing it should be ensured that, in a force-free state of the toothed rack, that is to say in a state in which no preload force or transverse force acts on the toothed rack, there is a certain play or spacing between the drive pinion and the toothed rack, in order that, after the application of the preload force, bending of the toothed rack can be effected until the toothed rack bears against the drive pinion and the drive pinion forms a counter bearing in the direction of action of the preload force.

Within the context of this invention, bending of the toothed rack is furthermore not restricted to meaning that a toothed rack which is rectilinear in the axial direction in a force-free state passes into an (elastically) curved state after the application of a transverse force. Within the context of this invention, bending of the toothed rack is also present if a toothed rack which is already curved in a force-free state passes into a rectilinear state after the application of a transverse force of corresponding magnitude. All possible intermediate states of the toothed rack which arise from the combination of the force-free initial state of the toothed rack and the transverse force acting on the toothed rack, said transverse force being characterized in particular by its point of engagement on the toothed rack, its direction of action and its magnitude, are encompassed by the expression "bending of the toothed rack" used here.

The bending of the toothed rack caused by the preload force exerted on the toothed rack by the thrust piece leads substantially to a displacement of the toothed rack in the radial direction, wherein the magnitude of the radial displacement at one point of the toothed rack is generally dependent on the axial spacing of said point from the point of engagement of the preload force (transverse force). Said radial displacement of the toothed rack leads to a bending moment acting in the toothed rack, which bending moment is suitable for preloading the machine element which is operatively connected to the toothed rack and which is mounted so as to be immovable radially with respect to the toothed rack. In this way, the generation of rattling noises, which may arise for example as a result of play of the operative connection between the machine element and the toothed rack, in particular in the event of alternating axial loads on the toothed rack, can be effectively prevented in a simple manner.

In one advantageous embodiment of the invention, the connection between the drive pinion and toothed rack permits at least one degree of freedom for a movement of the toothed rack. Such a degree of freedom of the toothed rack is provided for example with a straight toothing or helical toothing of drive pinion and toothed rack. Specifically, the engagement of drive pinion and toothed rack then has a degree of freedom, in particular a translatory degree of freedom, for a rectilinear movement of the toothed rack, in the direction in which the teeth of the toothed rack and of the drive pinion extend in each case. Mentioned as an example is the case of a straight toothing of drive pinion and toothed rack, in which the teeth of the drive pinion and of the toothed rack extend parallel to the longitudinal axis of the drive pinion. A free movement of the toothed rack along the direction of extent of the teeth, that is to say parallel to the longitudinal axis of the drive pinion, is therefore possible.

The significant advantage of said embodiment according to the invention is that the toothed rack can be moved in the direction of the degree of freedom without a significant, in particular disadvantageous, influence on the engagement between drive pinion and toothed rack, because during said movement guided in the direction of the degree of freedom, the toothed rack is not displaced with regard to the direct engagement direction of drive pinion and toothed rack.

The drive pinion may furthermore be mounted as close as possible to the toothed rack in a force-free state of the toothed rack in which no preload force or transverse force acts on the toothed rack, and may therefore directly form a counter bearing with respect to the transverse force acting on the toothed rack in the direct engagement direction. In this way, reliable engagement of drive pinion and toothed rack is ensured, such that high torques can be transmitted between the drive pinion and the toothed rack and a separation of drive pinion and toothed rack is effectively prevented, in particular even in the event of shock loadings. Furthermore, production-related tolerances of the toothed-rack steering gear can be compensated in a simple manner, as a result of which the production process of the toothed-rack steering gear according to the invention is simplified overall.

In one advantageous embodiment of the invention, the direction of action of the preload force acting on the toothed rack is inclined at an angle $\phi$ with respect to a direct engagement direction of drive pinion and toothed rack. The term "direct engagement direction of drive pinion and toothed rack" has already been discussed in detail further above. The direction of action, which is inclined with respect to the direct engagement direction by the angle $\phi$, of the preload force acting on the toothed rack makes it possible in a particularly simple manner by means of a single force to be imparted, for both a first transverse force component to be aligned in the direct engagement direction of drive pinion and toothed rack and a further, second transverse force component to be aligned perpendicular to the direct engagement direction. Therefore, the respective first and second transverse force components can be defined merely by determining the magnitude of the preload force and the angle $\phi$, wherein the first transverse force component, which acts in the direct engagement direction, acts as a pure pressure force of the toothed rack against the drive pinion, and the second transverse force component causes the bending of the toothed rack (bending force).

A further advantageous embodiment of the invention provides that the thrust piece is movably mounted in the steering housing, in particular so as to be movable in the direction of the toothed rack, and can be preloaded elastically against the toothed rack by means of at least one spring element, for example a helical spring or plate spring. Here, the spring element is supported at one side against the thrust piece itself and at the other side, that is to say on the side situated opposite the thrust piece, for example on the steering housing.

In a further advantageous embodiment, the spring element is supported on a clamping device which is connected to the steering housing, and which can in particular be screwed into the steering housing. The preload force exerted on the toothed rack by the thrust piece, or the magnitude of said preload force, can then be adjusted and varied by means of said clamping device at any time, in particular during the assembly and/or servicing of the toothed-rack steering gear. Production-related tolerances can likewise be easily compensated in this way.

Since the preload force exerted on the toothed rack by the thrust piece, or the magnitude of said preload force, is determined substantially by the spring force of the spring element, the magnitude of the preload force can be defined in a simple manner through suitable selection of the spring element. Furthermore, as a result of the elastic preload, it is possible in particular for shock loadings of the toothed rack which are transmitted to the thrust piece to be effectively absorbed by the toothed rack and/or the thrust piece. In the case of immovable, rigid mounting of the thrust piece, such shock loadings may possibly lead to component or material overloading, and as a result, to material fracture. Furthermore, as a result of the elastic preload of the thrust piece against the toothed rack and the movable mounting of said thrust piece in the steering housing, automatic wear compensation both of the frictionally locking connection between thrust piece and toothed rack and of the connection between the drive pinion and toothed rack is ensured. A manual readjustment of the connection between drive pinion and toothed rack can therefore be eliminated. Furthermore, as a result of the spring-loaded thrust piece, production-related tolerances in the drive pinion-toothed rack connection can be easily compensated, as a result of which the production process of the toothed-rack steering gear according to the invention can be simplified, and the assembly and/or servicing outlay can be considerably reduced.

A further advantageous embodiment of the invention provides that the thrust piece is held in a thrust piece guide, for example a bore, in the steering housing, wherein the longitudinal axis of the thrust piece guide is inclined at an angle with respect to the direct engagement direction between drive pinion and toothed rack. The direction of action of the preload force exerted on the toothed rack by the thrust piece can therefore be determined in a simple manner by means of the angle $\phi$ of the thrust piece guide.

According to one advantageous embodiment of the invention, the thrust piece is guided in the thrust piece guide with a clearance fit. This allows the thrustpiece to move within the thrust piece guide, because the thrust piece does not make contact with the entire inner surface of the thrust piece guide. The friction of the thrust piece within the thrust piece guide is therefore reduced. As a result, a greater part of the preload force provided by the spring element is available for being transmitted to the toothed rack. With the same spring element, that is to say a spring element which is unchanged in terms of size and weight, said additionally available force which can be transmitted to the toothed rack can be particularly advantageously utilized to form the bending force already explained. Furthermore, the clearance fit of the thrust piece and thrust piece guide simplifies the production process of the toothed-rack steering gear.

As a result of the abovementioned inclination of the thrust piece guide by the angle with respect to the direct engagement direction of drive pinion and toothed rack, the toothed-rack steering gear according to the invention furthermore effectively prevents the generation of rattling noises which could arise for example as a result of tilting of the thrust piece in the thrust piece guide on account of the play between thrust piece guide and thrust piece. In the toothed-rack steering gear according to the invention, on account of the inclination of the thrust piece guide by the angle $\phi$, the thrust piece is pushed against an inner wall section of the thrust piece guide by the preload force exerted on the thrust piece by the spring element. The thrust piece therefore always bears in a stable manner against an inner wall section of the thrust piece guide, and cannot tilt despite play which exists between thrust piece and thrust piece guide.

A further advantageous embodiment of the invention provides that the thrust piece has, on the contact surface which bears against the toothed rack, a recess for receiving the toothed rack. The toothed rack is correspondingly formed, at the thrust piece side, at least in the connecting section of thrust piece and toothed rack, with an opposite form which fits into the recess of the thrust piece. As a result of said positively locking connection in the non-axial, radial direction of the toothed rack, a reliable transmission of the preload force, specifically of the first and second transverse force components, from the thrust piece to the toothed rack is ensured. As a result of said design of the thrust piece, good guidance of the toothed rack is likewise provided in the axial direction in which the thrust piece and the toothed rack have a frictionally locking connection.

According to one preferred embodiment of the invention, the operative connection is a screw connection and the machine element is a recirculating ball nut which is rotatably in engagement with a ball screw section of the toothed rack and which is mounted so as to be immovable in the axial direction relative to the toothed rack. The rotation of the recirculating ball nut causes a movement of the toothed rack in the axial direction on account of the axially immovable mounting relative to the toothed rack. The ball-screw drive, which comprises the ball screw section of the toothed rack and the recirculating ball nut, is therefore capable of converting a rotational movement of the recirculating ball nut into a longitudinal movement of the toothed rack. The recirculating ball nut is therefore preferably connected for example via a belt or gearwheel mechanism to an output shaft, which is arranged for example parallel to the toothed rack, of an electric motor, with the aid of which a steering assistance force can be transmitted to the toothed rack.

The screw connection permits very precise positioning of the toothed rack and therefore precise metering of the assistance force to be transmitted to the toothed rack via the recirculating ball nut. Furthermore, the ball-screw drive is characterized by low friction and low wear. Said factors are highly advantageous for optimum and precise steering feel imparted to an operator or driver by the toothed-rack steering gear according to the invention.

Furthermore, the toothed-rack steering gear according to the invention also provides the use of a conventional ball-screw drive. It is therefore possible to dispense with the use of expensive special designs. As already described, a conventional ball-screw drive duly has play, which cannot be entirely eliminated, between the recirculating ball nut and the ball screw section of the toothed rack, but the generation of rattling noises is effectively prevented by the preload, according to the invention, of the machine element or recirculating ball nut.

Also proposed is a servo steering system, in particular for a motor vehicle, which servo steering system has a toothed-rack steering gear according to the invention, wherein the machine element is a recirculating ball nut which is rotatably in engagement with a ball screw section of the toothed rack and which is mounted so as to be immovable in the axial direction relative to the toothed rack. The servo steering system according to the invention also has an electric motor and a gear mechanism which connects an output shaft of the electric motor to the recirculating ball nut, such that a steering assistance force can be transmitted by the electric motor to the toothed rack by means of the rotatable drive of the recirculating ball nut, wherein the magnitude of the steering assistance force to be transmitted to the toothed rack can be determined as a function of the magnitude of a steering force that can be imparted, in particular by a driver, via a steering shaft connected to the drive pinion. For this purpose, the servo steering system according to the invention provides a sensor arrangement with which the steering force that can be transmitted via the steering shaft to the drive pinion can be determined. The electric motor is preferably arranged with its output shaft parallel to the toothed rack, such that the servo steering system according to the invention is of space-saving construction and is for example also suitable for use in small vehicles.

Figure 2:
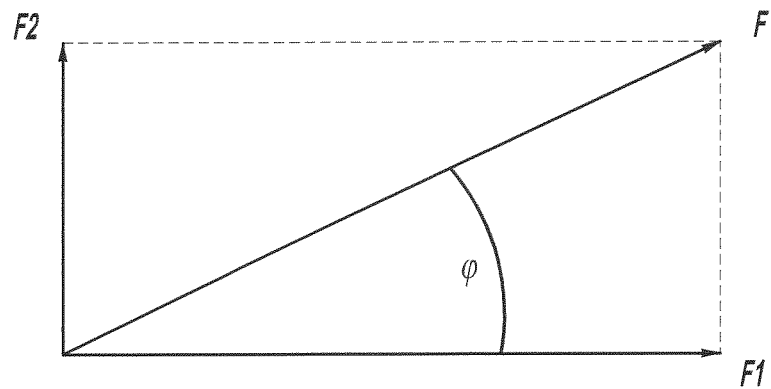
Figure 3:
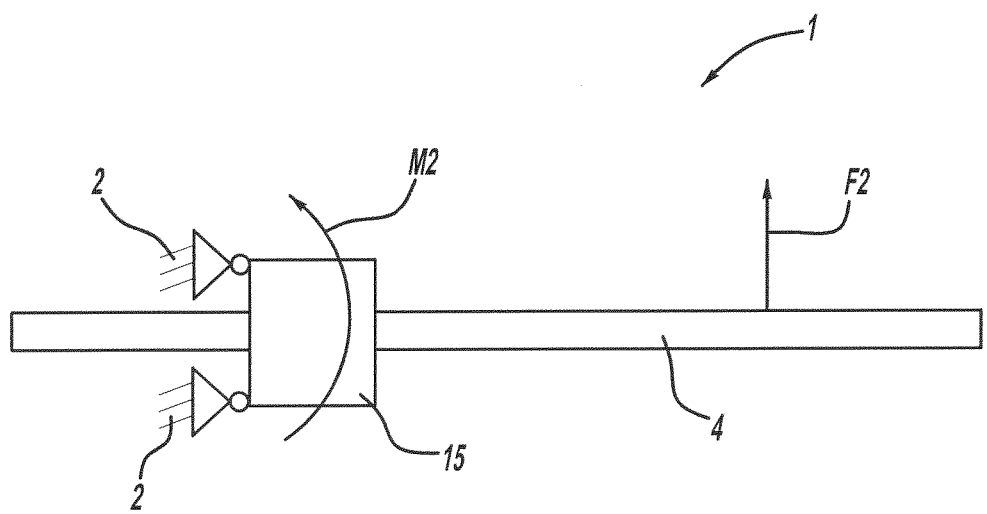

Further advantageous details and effects of the invention are explained in more detail below on the basis of an exemplary embodiment illustrated in the figures. In the figures:

FIG. 1 shows a schematic side-on sectional view of a toothed-rack steering gear according to the invention, FIG. 2 shows a force vector diagram for explaining the transmission of force in the toothed-rack steering gear according to the invention illustrated in FIG. 1, and FIG. 3 shows a schematic front view of the toothed-rack steering gear according to the invention illustrated in FIG. 1.

FIG. 1 schematically illustrates an exemplary embodiment of a toothed-rack steering gear 1 according to the invention in a side-on sectional view. The toothed-rack steering gear 1 comprises a drive pinion 3 which is rotatably mounted in a steering housing 2, a toothed rack 4 which is axially movably mounted in the steering housing 2, and a thrust piece 5 which preloads the toothed rack 4 against the drive pinion 3. The rotatable mounting of the drive pinion 3 and the axially movable mounting of the toothed rack 4 are not illustrated in any more detail in FIG. 1. Likewise, the steering housing 2 is merely schematically indicated in FIG. 1.

The drive pinion 3 illustrated in FIG. 1 is of substantially cylindrical design and has, on its outer circumference, a toothing 6 which engages with a toothing 7 of the toothed rack 4. In the exemplary embodiment described here, the drive pinion 3 and the toothed rack 4 have straight toothings, that is to say the teeth of the toothing 6 of the drive pinion 3 and the toothing 7 of the toothed rack 4 extend parallel to the longitudinal axis of the drive pinion 3. The drive pinion 3 and the toothed rack 4 may however likewise be formed with some other type of toothing, for example a helical toothing.

The toothing 7 of the toothed rack 4 is formed at least in that axial section of the toothed rack 4 which faces toward the drive pinion 3 and which can come into engagement with the drive pinion 3 during an axial movement of the toothed rack 4 from one axial end position to another, opposite axial end position. As can be seen from FIG. 1, the toothed rack 4 has substantially a circular cross section, wherein the axial section in which the toothing 7 is formed is flattened in order to form as large as possible a stable engagement region of the toothings 6 and 7 in the longitudinal direction of the drive pinion, such that even relatively large torques which may arise for example in the event of shock loadings can be reliably transmitted between the drive pinion 3 and the toothed rack 4, without the corresponding components being exposed to the risk of material overloading.

At its upper axial end, the drive pinion 3 is connected to a steering shaft 9 for conjoint rotation therewith, which steering shaft is connected in turn to a steering wheel (not illustrated in FIG. 1) by means of which an operator, for example a driver of a motor vehicle, generates steering inputs.

The drive pinion 3 is preferably rotatably mounted in the steering housing 2 in an upper bearing and lower bearing (not illustrated in FIG. 1). The bearings are designed in a suitable manner as plain bearings and/or rolling bearings and are formed in each case as fixed bearings, that is to say they mount the drive pinion 3 in the steering housing 2 in a substantially fixed manner in the radial and axial directions.

As can be seen from FIG. 1, that side of the toothed rack 4 which is situated opposite the toothing 7 makes contact with a contact surface 10 of the thrust piece 5. The toothed rack 4 is mounted on the contact surface 10 in a sliding manner in the axial direction. The contact surface 10 advantageously has a form matched to the form of the toothed rack 4. In particular, the contact surface 10 of the thrust piece 5 in the toothed-rack steering gear 1 according to the invention illustrated in FIG. 1 has a recess for receiving the toothed rack 4. This ensures stable guidance of the toothed rack 4 in the axial direction. Perpendicular to the axial direction of the toothed rack 4, that is to say in the non-axial direction, the contact surface 10 forms a positively locking connection with the toothed rack 4. In this way, a good transmission of the preload force, in particular of the force components of the preload force which act in different force directions, as will be explained further below, from the thrust piece to the toothed rack is ensured.

The thrust piece 5 is held in a thrust piece guide 11 in the steering housing 2. For example, the thrust piece guide 11 is an opening or bore which is formed in the steering housing 2 and into which the thrust piece 5 is mounted so as to be movable, in particular movable in the direction of the toothed rack 4. As can be seen from FIG. 1, the longitudinal axis 12 of the thrust piece guide 11 is inclined at an angle with respect to a direct engagement direction 13 of the drive pinion 3 and of the toothed rack 4.

A spring element 14 is arranged between that surface of the thrust piece 5 which is situated opposite the contact surface 10 and the steering housing 2, such that the thrust piece 5 is elastically preloaded against the toothed rack 4 by the spring element 14. The spring element 14 is preferably supported against the steering housing 2 not directly but rather via a clamping device (not illustrated in FIG. 1) by means of which the preload of the spring element 14, and therefore the preload force exerted on the toothed rack 4 by the thrust piece 5, can be adjusted. For this purpose, the clamping device can for example be screwed into the steering housing 2, such that a simple adjustment of the preload of the spring element 14 is possible at any time. The adjustment of the spring or preload force is therefore possible without great outlay even when the toothed-rack steering gear 1 according to the invention is in an installed state, for example in a motor vehicle.

As a result of the inclination of the longitudinal axis 12 at an angle $\phi$ with respect to the direct engagement direction 13 of the drive pinion 3 and of the toothed rack 4, the preload force exerted on the toothed rack 4 by the thrust piece 5, which preload force is illustrated in FIG. 1 by the preload force vector F, likewise acts in a direction which is inclined by the angle $\phi$ with respect to the direct engagement direction 13 of the drive pinion 3 and the toothed rack 4. The direction of action of the preload force F can therefore be determined in a simple manner by means of the position of the thrust piece guide 11.

FIG. 2 shows a force vector diagram illustrating the transmission of the preload force F by the toothed-rack steering gear 1 according to the invention illustrated in FIG. 1. In particular, the diagram illustrates the transmission of the preload force F at the connection between the toothed rack 4 and the drive pinion 3. As can be seen from FIG. 2, the preload force vector F is composed of two force components F1 and F2 which are perpendicular to one another. Here, the first force component F1 is the pure pressure force with which the toothed rack 4 is pressed against the drive pinion 3 in the direct engagement direction 13. The second force component F2 is a force component which, in the exemplary embodiment of the toothed-rack steering gear 1 according to the invention illustrated in FIG. 1, is aligned perpendicular to the axial extent of the toothed rack 4 and parallel to the longitudinal axis 8 of the drive pinion 3. Both the force component F1 and also the force component F2 act perpendicular to the longitudinal extent of the toothed rack 4 and are therefore likewise referred to here as transverse forces or transverse force components F1, F2.

As has already been described further above, in the toothed-rack steering gear 1 illustrated in FIG. 1, the drive pinion 3 and the toothed rack 4 have in each case a straight toothing, that is to say the teeth of the toothings 6 and 7 extend in each case parallel to the longitudinal axis 8 of the drive pinion 3. The connection between the drive pinion 3 and the toothed rack 4 therefore permits a degree of freedom for a movement of the toothed rack 4 parallel to the longitudinal axis 8 of the drive pinion 3. The transverse force component F2 of the preload force F acts in precisely said direction, such that the transverse force F2 and consequently the preload force F exerted on the toothed rack 4 by the thrust piece 5 causes bending of the toothed rack 4 in said direction. The transverse force component F2 is consequently, with regard to the toothed rack 4, a bending force directed parallel to the longitudinal axis 8 of the drive pinion 3.

In toothed-rack steering gears according to the prior art, the preload force F transmitted to the toothed rack 4 by the thrust piece 5 acts only in the direct engagement direction 13, that is to say the angle $\phi$ is 0°. Therefore, in the prior art, the preload force F is equal to the pressure force F1 with which the toothed rack 4 is pressed against the drive pinion 3. In this way, a separation of the drive pinion 3 and toothed rack 4 is prevented, and production-related tolerances are compensated.

In the toothed-rack steering gear 1 according to the invention illustrated in FIG. 1, the angle $\phi$ is not equal to 0°, as a result of which, as already described, the bending force F2 acts in the axial direction of the drive pinion 3 and causes bending of the toothed rack 4 in said direction. That is to say, the toothed rack 4 is displaced in the radial direction about the point of engagement of the bending force F2, accordingly upward in FIG. 1.

As can now be seen in FIG. 3, which shows a front view of the toothed-rack steering gear 1 illustrated in FIG. 1, the bending force F2 which acts on the toothed rack 4 perpendicular to the longitudinal extent causes a bending moment M2 along the axial direction of the toothed rack 4. FIG. 3 also shows a machine element 15 which is mounted, for example on the steering housing 2, so as to be immovable at least in the radial direction with respect to the toothed rack 4. In the toothed-rack steering gear 1 illustrated in FIGS. 1 and 3, the machine element 15 is a recirculating ball nut which is rotatably in engagement with a ball screw section (not illustrated in FIG. 3) of the toothed rack 4. As can be seen in FIG. 3, the recirculating ball nut 15 is mounted on the steering gear housing 2 so as to be immovable both in the radial direction and also in the axial direction with respect to the toothed rack 4.

Consequently, the bending moment M2 causes a preload of the recirculating ball nut 15, such that the generation of rattling noises as a result of play between the recirculating ball nut 15, which is operatively connected to the toothed rack 4, and the toothed rack 4 is prevented in an effective and simple manner merely by means of the direction of action, which is inclined by the angle with respect to the direct engagement direction 13, of the preload force F. The toothed-rack steering gear 1 according to the invention therefore advantageously permits the use of conventional, cheap ball-screw drives for transmitting a steering assistance force to the toothed rack 4.

It can also be seen in FIG. 1 that the thrust piece 5 is held or mounted in the thrust piece guide 11 with a certain degree of play 16. The thrust piece 5 is advantageously guided in the thrust piece guide 11 with a clearance fit. This allows the thrust piece 5 to move freely within the thrust piece guide 11, because the thrust piece does not make contact with the entire inner surface of the thrust piece guide 11. The friction of the thrust piece 5 within the thrust piece guide 11 is therefore reduced, and a greater part of the preload force provided by the spring element 14 is available for being transmitted to the toothed rack 4. With a spring element which is the same as spring elements of toothed-rack steering gears according to the prior art, that is to say a spring element which is unchanged in terms of size and weight, the spring element 4 in the toothed-rack steering gear 1 according to the invention provides a greater usable preload force F, that is to say a greater preload force F that can be transmitted to the toothed rack 4 by the thrust piece 5. Furthermore, the clearance fit of the thrust piece 5 and thrust piece guide 11 simplifies the production process of the toothed-rack steering gear 1.

It is advantageously the case that, on account of the inclination of the thrust piece guide 11 and of the direction of action of the preload force F by the angle φ with respect to the direct engagement direction 13, the toothed-rack steering gear 1 according to the invention likewise effectively prevents the generation of rattling noises at the thrust piece 5 itself, which may arise for example as a result of tilting of the thrust piece 5 in the thrust piece guide 11 on account of the clearance fit. In the toothed-rack steering gear 1 according to the invention, the thrust piece 5 is however pressed against a section of the inner wall of the thrust piece guide 11 by the preload force exerted on the thrust piece 5 by the spring element 14. The thrust piece 5 therefore always bears in a stable manner against an inner wall section of the thrust piece guide 11, and cannot tilt despite play 16 which exists between the thrust piece 5 and the thrust piece guide 11.

In a preferred embodiment, the toothed-rack steering gear according to the invention is used in a motor vehicle having an electric servo steering system with toothed rack drive.

LIST OF REFERENCE NUMERALS

1 Toothed-rack steering gear
2 Steering housing
3 Drive pinion
4 Toothed rack
5 Thrust piece
6 Toothing of 3
7 Toothing of 4
8 Longitudinal axis of 3
9 Steering shaft
10 Contact surface
11 Thrust piece guide
12 Longitudinal axis of 11
13 Direct engagement direction of 3 and 4
14 Spring element
15 Machine element, recirculating ball nut
16 Ray between 5 and 11
F Preload force
F1 Pressure force of 4 against 3
F2 Bending force
M2 Bending moment of F2
φ Angle between 12 and 13

The invention claimed is:

1. A toothed-rack steering gear having a drive pinion which is rotatably mounted in a steering housing and which engages into a toothed rack which is axially movably mounted in the steering housing, and having a thrust piece which preloads the toothed rack against the drive pinion,
wherein
at least one machine element which is mounted so as to be radially immovable with respect to the toothed rack (4) is operatively connected to the toothed rack, and the preload force exerted on the toothed rack by the thrust piece causes bending of the toothed rack.

2. The toothed-rack steering gear as claimed in claim 1, wherein
the connection between the drive pinion and toothed rack permits at least one degree of freedom for a movement of the toothed rack.

3. The toothed-rack steering gear as claimed in claim 1, wherein
the direction of action of the preload force acting on the toothed rack is inclined at an angle φ with respect to a direct engagement direction of said drive pinion and said toothed rack.

4. The toothed-rack steering gear as claimed in claim 1, wherein
the thrust piece is movably mounted in the steering housing and can be preloaded elastically against the toothed rack by means of at least one spring element.

5. The toothed-rack steering gear as claimed in claim 1 wherein
the thrust piece is held in a thrust piece guide in the steering housing wherein the longitudinal axis of the thrust piece guide is inclined at an angle φ with respect to the direct engagement direction between said drive pinion and said toothed rack.

6. The toothed-rack steering gear as claimed in claim 5 wherein
the thrust piece is guided in the thrust piece guide with a clearance fit.

7. The toothed-rack steering gear as claimed in claim 1 wherein
the thrust piece has, on the contact surface which bears against the toothed rack, a recess for receiving the toothed rack.

8. The toothed-rack steering gear as claimed in claim 1 wherein
the operative connection is a screw connection and the machine element is a recirculating ball nut which is rotatably in engagement with a ball screw section of the toothed rack and which is mounted so as to be immovable in the axial direction relative to the toothed rack.

9. The toothed-rack steering gear as claimed in claim 2, wherein
the direction of action of the preload force acting on the toothed rack is inclined at an angle φ with respect to a direct engagement direction of said drive pinion and said toothed rack.

* * * * *